United States Patent
Seidel et al.

(10) Patent No.: US 12,040,619 B2
(45) Date of Patent: Jul. 16, 2024

(54) ARRANGEMENT HAVING STORE FOR ELECTRICAL ENERGY AND REGENERATIVE ENERGY GENERATOR, IN PARTICULAR A WIND POWER PLANT, AND METHOD FOR OPERATING SAME

(71) Applicant: Siemens Gamesa Renewable Energy Service GmbH, Hamburg (DE)

(72) Inventors: Matthias Seidel, Kiel (DE); Atanas Dimov, Kaltenkirchen (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 452 days.

(21) Appl. No.: 17/297,772

(22) PCT Filed: Nov. 26, 2019

(86) PCT No.: PCT/EP2019/082580
§ 371 (c)(1),
(2) Date: May 27, 2021

(87) PCT Pub. No.: WO2020/109300
PCT Pub. Date: Jun. 4, 2020

(65) Prior Publication Data
US 2022/0052530 A1 Feb. 17, 2022

(30) Foreign Application Priority Data
Nov. 28, 2018 (DE) .................... 10 2018 009 341.8

(51) Int. Cl.
*H02J 3/38* (2006.01)
*H02J 3/46* (2006.01)
(Continued)

(52) U.S. Cl.
CPC ............... *H02J 3/381* (2013.01); *H02J 3/46* (2013.01); *H02J 7/0048* (2020.01); *H02J 3/004* (2020.01);
(Continued)

(58) Field of Classification Search
CPC .. H02J 3/381; H02J 3/46; H02J 7/0048; H02J 3/004; H02J 2203/10; H02J 2300/28;
(Continued)

(56) References Cited

U.S. PATENT DOCUMENTS 10,483,789 B2 * 11/2019 Foggia ..................... H02J 7/24
2009/0295162 A1 12/2009 Oohara et al.
(Continued)

FOREIGN PATENT DOCUMENTS

DE 102011054971 A1 5/2013
DE 102016125953 A1 7/2018
(Continued)

OTHER PUBLICATIONS

International Search Report and Written Opinion mailed Jan. 30, 2020, directed to International Application No. PCT/EP2019/082580; 20 pages.

*Primary Examiner* — Zhipeng Wang
(74) *Attorney, Agent, or Firm* — Morrison & Foerster LLP (57) ABSTRACT

An arrangement comprising a regenerative energy generator and a store for electrical energy to be output to a grid, the regenerative energy generator including an energy converter for converting renewable energy sources into electrical energy and a power control unit which has an input for a target power output and controls the power generation by the regenerative energy converter, with a charge controller for the store also being provided, which sets a minimum operating reserve and outputs a signal for a target state of charge
(Continued)

(SoC) of the store. In order to achieve improved utilization of the store, a correction unit is connected to the charge controller and continuously modifies the signal for the target state of charge (SoC). A sequence control unit is actuated by the correction unit and influences the power control unit of the regenerative energy generator according to an output value of the correction unit.

14 Claims, 4 Drawing Sheets

(51) Int. Cl.
  *H02J 7/00* (2006.01)
  *H02J 3/00* (2006.01)
(52) U.S. Cl.
  CPC ....... *H02J 2203/10* (2020.01); *H02J 2300/28* (2020.01)

(58) Field of Classification Search
  CPC .... H02J 3/32; F03D 9/11; Y02E 70/30; Y04S 10/50
  See application file for complete search history.

(56) References Cited

U.S. PATENT DOCUMENTS

| | | |
|---|---|---|
| 2014/0204613 A1 | 7/2014 | Blanz et al. |
| 2017/0005470 A1* | 1/2017 | Wagoner .................. H02J 3/28 |
| 2018/0131224 A1* | 5/2018 | Foggia ...................... H02J 7/24 |
| 2020/0028367 A1 | 1/2020 | Brombach et al. |

FOREIGN PATENT DOCUMENTS

| | | |
|---|---|---|
| EP | 3148036 A1 | 9/2015 |
| EP | 3026774 A1 | 1/2016 |
| WO | 2011/129003 A1 | 10/2011 |
| WO | 2020/109300 A1 | 6/2020 |

* cited by examiner

ARRANGEMENT HAVING STORE FOR ELECTRICAL ENERGY AND REGENERATIVE ENERGY GENERATOR, IN PARTICULAR A WIND POWER PLANT, AND METHOD FOR OPERATING SAME

CROSS-REFERENCE TO RELATED APPLICATIONS

This application is a U.S. national stage application under 35 USC 371 of International Patent Application No. PCT/EP2019/082580, filed Nov. 26, 2019, which claims the priority of DE Application No. 10 2018 009 341.8, filed Nov. 28, 2018, the entire contents of each are incorporated herein by reference.

FIELD OF THE DISCLOSURE

The invention relates to an arrangement for energy generation and storage. It comprises a regenerative energy generator, in particular a wind power plant and/or a photovoltaic system, and a storage means for electrical energy.

BACKGROUND OF THE DISCLOSURE

To ensure a high level of supply security, electrical grids must be able to rapidly compensate for differences between, on the one hand, power generation and, on the other, power consumption. The electrical power required for this is called operating reserve. Positive operating reserve is needed to compensate for a usually sudden deficit in power generation, for example the failure of a power plant. In the case of a negative operating reserve, the opposite is true: there is then too much power generation relative to power consumption, such that generation must be reduced. In both cases, the operating reserve bridges the power surplus, or the power deficit, rapidly and for a limited period of time, namely until further reserve generation can be ramped up, or generation units can be taken off the grid. What is meant by a limited period of time varies from country to country, typically being in the range of from 15 to 60 minutes.

In conventional electricity grids, electrical power is mainly generated by means of conventional power plants, which usually have synchronous generators driven by turbines. An oversupply, or a shortage, of electrical power (active power) becomes noticeable through a change in grid frequency. Such changes in grid frequency result from the fact that if there is a lack of active power in the grid (generation is too low), the synchronous generators slow down due to their design, or if there is too much active power (generation is too high for consumption), the synchronous generators are relieved and thus accelerate. This braking or acceleration is counteracted by the large mass inertia of the rotating parts of the synchronous generators, including the driving turbines coupled to them. Thus, classical synchronous generators have an inherently balancing effect with regard to changes in active power. This effect only occurs in the time range of a few seconds, such that grids that have predominantly conventional power plants are also dependent on balancing power.

However, in electricity grids, conventional power plants with their large synchronous generators are increasingly being replaced by smaller decentralized power plants whose feed-in power depends on the primary energy supply (e.g. the wind speed). Examples of this are typically plants for regenerative energy generation from renewable energy sources, in particular wind power plants, or wind farms, or photovoltaic plants. Power plants for regenerative energy generation can only provide balancing power in dependence on the primary energy supply, and must be operated below the possible output (limited) if positive operating reserve is to be provided.

On the other hand, however, it is actually an intrinsic, mandatory prerequisite for offering operating reserve is that it can be guaranteed to be available. On the one hand, it must be guaranteed that it can be fed in for a certain period of time when required (typically a period of 30 minutes), and it must be guaranteed to be available over a certain period of time (typically, availability for a period of one week is required in Germany).

While conventional power plants are by their nature usually able to meet this requirement of guaranteed availability, this is usually not the case for regenerative energy generation plants. In particular, regenerative energy generation plants lack a sufficiently reliable forecast for the required time period (the time period over which the availability of the operating reserve is guaranteed) and, moreover, these plants often cannot provide (or can provide only to a very limited extent) positive operating reserve (if the wind does not blow sufficiently, no additional power can be fed in).

In order nevertheless to involve the regenerative energy generation plants in the provision of operating reserve, electrical storage means are increasingly being assigned to them. However, the provision of the storage means is expensive and their utilization is sometimes not optimal. Typically, they are operated with a state of charge of about 50% in order to have both an upward reserve to take up power (negative operating reserve) and a downward reserve to deliver additional power (positive operating reserve). The storage means must therefore be dimensioned twice as large as is actually required for the balancing power to be provided.

In order to minimize the resource requirement for this, it is known to reduce the storage means by providing an energy converter (EP 3 148 036 A1). This energy converter is designed to act as an additional load, in particular in the case of negative operating reserve, and thus to dissipate power such that it does not have to be taken up by the storage means. The storage means can therefore be operated with a higher state of charge (ideally 100%), and consequently be smaller in size. This advantage is offset by the disadvantage that an additional element is required to dissipate excess energy; moreover, this dissipation of electrical energy due to the lack of possible storage means is a waste of energy, which is to be avoided.

BRIEF SUMMARY OF THE DISCLOSURE

Aspects of the invention are based on the object of avoiding this disadvantage and achieving a better utilization of the storage means.

In the case of an arrangement comprising a regenerative energy generator and a storage means for electrical energy for delivery to a grid, wherein the regenerative energy generator has an energy converter for converting renewable energy sources into electrical energy, and a power control unit that has an input for a setpoint power output and monitors the power generation by the regenerative energy converter, and furthermore a charge control for the storage means is provided, which sets a minimum balancing power to be provided and outputs a signal for a setpoint state of charge of the storage means, it is provided according to an aspect of the invention that connected to the charge control there is a correction unit, which continuously modifies the signal for the setpoint state of charge, and a sequential control unit is provided that is controlled by the correction unit and acts upon the power control unit of the regenerative energy generator in dependence on an output value of the correction unit.

First, some of the terms used are to be explained.

A regenerative generator is a plant having an energy converter for the generation of electrical energy from renewable primary energy. In particular, this includes wind power plants, photovoltaic plants or thermal solar power plants. Typical for these is that the primary energy is not directly controllable (whether and how strongly the wind blows, the sun shines, etc.).

The storage means is designed at least to store or retrieve electrical energy generated by the energy generator, and to deliver it to or draw it from the grid.

According to an aspect, the invention is based on the idea of not leaving the state of charge of the storage means fixed (e.g. at 50% or 100%) during the provision of balancing power, but to modify it dynamically by means of a correction unit, the regenerative energy generator being acted upon in dependence on the correction, and its setpoint power being changed accordingly. Thus, the negative balancing power to be provided is dynamically distributed between storage means on the one hand and the regenerative energy producer on the other. For example, if there is a lot of wind, the state of charge of the storage means can be increased by the correction unit, since, if there is a lot of wind and thus a high output of the wind power plant, the possibly required negative operating reserve can be achieved by throttling the wind power plant without having to resort to the storage means for this purpose. The storage means therefore does not need to have a correspondingly large amount of free space, i.e. it can be charged to a level significantly higher than 50%. The invention has recognized that this can be achieved by combining two measures, namely, on the one hand, the dynamic configuration of the setpoint state of charge on the storage means, combined with a change in the setpoint power of the regenerative energy generator emanating from the storage means, by means of the sequential control. In this way, the sequential control turns the regenerative energy generator into a "helper" of the storage means. This is exactly the opposite approach to that hitherto common in the prior art.

The advantages achieved in this way are considerable. On the one hand, not only is the provision of operating reserve improved, but the capacity of the storage means can now also be used for delayed provision of the generated electrical energy, i.e. for so-called production shifting. This time-shifting, also known as "production shifting", is of considerable importance in grid operation, as it enables a shift in the power feed-in with respect to the grid. Demand peaks can thus be met, which makes it particularly suitable for situations when energy is in short supply on the grid and is therefore especially important. This enables the regenerative energy generators equipped according to the invention to enter new fields of use, in particular participation in the free trade of electricity on the so-called electricity exchanges.

According to an aspect of the invention, use of the energy storage means is doubled, namely, on the one hand, for the provision of balancing power (as before), but also, going beyond that, for "production shifting" to satisfy demand peaks (electricity exchange). The storage means is thus used much better, and without the need for an expensive expansion of the storage means capacity as such. The invention achieves this solely through clever use and control of the storage means itself and of the associated regenerative energy generator. It is always ensured in this case that the required balancing power is immediately available on demand. In this case, a measure of the available primary power is preferably applied to the correction unit as an input parameter, in particular it can be a prediction (forecast) for the available primary power. A particular advantage is that this prediction can be shorter than the time period over which the availability of the operating reserve is guaranteed. The forecast period can therefore be shorter than the guarantee period (also referred to above as the "required time period"). This is a particularly advantageous aspect of the invention.

The sequential control expediently acts upon the power control unit of the regenerative energy generator in such a manner that it has a master/slave relationship with the correction unit of the storage means. In this case, the correction unit is the master, and accordingly the power control unit of the regenerative energy generator is the slave. It can thereby be achieved that, for example, when there is sufficient wind, the storage means can be completely fully charged and, by means of the sequential control, the negative operating reserve is then not provided via the storage means, but by limiting of the wind power plant. If, for example, both sufficient wind and a period with a tendential oversupply of energy in the grid are predicted for a subsequent period (e.g. 48 hours), then, according to the invention, the storage means can be fully charged (and relatively less power delivered to the grid) in order to discharge the storage means only at a later point in time when there are demand peaks in the grid (for an appropriate remuneration), while still keeping sufficient operating reserve available.

Advantageously, the correction unit is designed for a plurality of input parameters. In particular, further parameters are predicted values for the available primary power (wind strength or sunshine intensity), predicted values for electricity demand in the grid, minimum values for the operating reserve to be held available, energy storage-means capacity and power, setpoint operating reserve, and/or state of charge of the storage means. With such a plurality of input parameters for the correction unit, a better prediction, or adaptation, of the state of charge of the storage means (and, depending on this, also a corresponding power setting of the regenerative energy generator, via the sequential control) can be achieved. Expediently, additional statistical characteristics, in particular those for a confidence interval, are also applied, at least for some of the input parameters. In this way, a finer adaptation and higher reliability can be achieved, in particular in the area of the prediction of the power production (wind prediction or sunshine prediction). The same also applies to the prediction of the demand situation in the grid.

Expediently, the correction unit has an optimization means, which is designed to determine the signal for the setpoint state of charge on the basis the input parameters, by means of an optimization module. By means of an optimization calculation known per se, the optimal setpoint state of charge of the storage means can thus be determined in relation to the input parameters and, via the sequential control, the power to be delivered by the regenerative energy generator can also be determined accordingly. In the optimization module, a gradient method, a neural network or an evolutionary algorithm are expediently implemented as optimization methods. Such optimization methods are known per se and therefore do not need to be explained in greater detail here.

The input parameters are preferably time-dependent, i.e. variable over time. This applies in particular to the prediction for the available primary power, but also to the demand situation in the grid. Furthermore, the correction unit is preferably realized in such a way that it evaluates the input parameters in a time-phased manner. This makes it possible to achieve a dynamic progression in the determination of the setpoint state of charge, and thus a more precise adaptation to the respectively changed conditions.

According to a particularly preferred embodiment of the invention, weighting factors are further provided for at least one of the input parameters, namely, in particular for the electricity demand in the grid and/or generated power. The weighting factors may optionally be different depending on the sign (for positive or negative). With the weighting factors, a measure for the importance of the input parameters can be set in each case, and the measure may also vary over time. This can be used to express how important a certain parameter is at a certain point in time. This is particularly useful with regard to yield management of regenerative energy generation, where the weighting factor can stand for a price to be achieved (for example on an electricity exchange). Weighting is a valuable tool for optimization.

With regard to the setpoint power output of the regenerative energy generator, it is advantageously provided that a reference signal for a setpoint power output is applied externally. However, it may also be provided that it is generated internally, in particular by means of a frequency static. In the latter case, for example, the regenerative energy generator increases its power output in the case of a decreasing frequency (below the normal value), and decreases its power output in the opposite case with an increasing frequency (above the normal value). In this way, a self-regulation can be achieved that is similar in its basic behavior to that of a synchronous generator in a conventional power plant.

The operation of the arrangement according to the invention is briefly outlined below on the basis of an example of a wind power plant as a regenerative energy generator. In the case where sufficient primary energy is available (because the wind blows sufficiently strongly), positive and negative operating reserves can basically be maintained, both by the wind power plant itself and by the storage means. It is generally the case that the choice of the distribution between the generator and the storage means should, on the one hand, guarantee a minimum control reserve (positive and negative) at all times and, on the other hand, be as efficient and economical as possible. On the other hand, if no or only insufficient primary energy is available (e.g. in the event of a lull), it must be ensured that the minimum control reserve offered can be made available with the storage means alone. This is done in a known manner by setting a defined state of charge; for example, if symmetrical primary control reserve is required (positive and negative are equal), this state of charge is 50%. Since this operating reserve must be available at all times, it is necessary that the state of charge is set and reached in this way. In other words, it is not sufficient to detect a lull and then adjust the storage means; rather, the lull must be predicted in order to approach the storage means state as the wind decreases.

The invention can achieve all this, as described above. The behavior can be improved by selection of different optimization algorithms and, if necessary, by optional further input parameters, such as one for an uncertainty of the weighting factors for the fed-in energy (for example, the market price forecast), or such a parameter that takes into account the efficiency of the storage means or self-discharge of the storage means (and thus penalizes rather an excessively long storage duration).

The invention further relates to a corresponding method. For further explanation, reference is made to the above description.

BRIEF DESCRIPTION OF THE FIGURES

The invention is described in greater detail in the following with reference to the appended drawing, on the basis of an exemplary embodiment. There are shown:

FIG. 4a, b, c diagrams relating to the operating behavior of the wind power plant.

DETAILED DESCRIPTION OF THE DISCLOSURE

Figure 1:
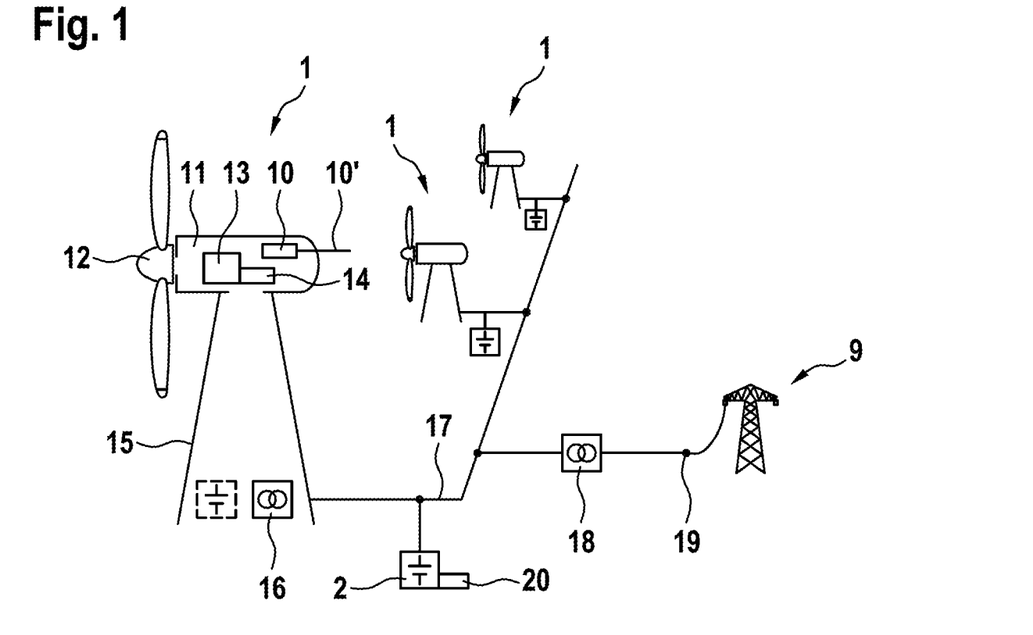
FIG. 1 a general representation of a wind power plant having a storage means according to an exemplary embodiment of the invention.

A wind power plant denoted in its entirety by the reference 1, together with a storage means 2, forms an arrangement according to an exemplary embodiment of the invention.

The wind power plant 1 is of a conventional design. It has a tower 15, at the upper end of which a nacelle 11 is arranged so that it can swivel in the azimuth direction. Rotatably arranged on one end of the nacelle is a wind rotor 12, which via a rotor shaft (not represented) drives a generator 13, which acts in combination with a converter 14 to generate electrical power. The thus generated electrical power is led via an internal line (not represented) to a system transformer 16 and, via a connection line 17, to a mostly park-internal central grid. The storage means 2 is also connected to the connection line 17. Further wind power plants 1 of the wind farm may also be connected, which are substantially of the same design and are expediently connected to a common storage means of the wind farm; however, they may also each have their own storage means 2. The electrical energy generated in this way is conducted via a wind farm transformer 18 to a transfer point 19, from where it is fed into a public grid 9. The operation of the wind power plant 1 is controlled by an operation control 10. To that extent, all this is conventional and therefore does not need to be explained further. It should be noted that a plurality of wind power plants operated according to the invention do not necessarily have to be combined in a wind farm; they may also be arranged independently of each other.

The storage means 2 is basically a conventional electrical energy storage means, which in particular has a multiplicity of accumulators, but alternative storage-means technologies may also be provided, such as compressed air, liquid air, hydrogen or pumped storage. The operation of the storage means 2 is monitored by a charge control 20. The latter, in particular, sets a desired state of charge (SoC) that is to be assumed by the storage means 2. The storage means 2 serves, in particular, to compensate for fluctuations in the power output of the wind power plant 1, or to supply or take up additional power on demand, in short to provide an operating reserve. All this is also known per se and therefore does not need to be described further.

It should be noted that, in the case of the exemplary embodiment described here, the storage means 2 is assigned to the wind power plant 1 and is arranged externally to it. This is not absolutely necessary. Thus, in particular, the storage means 2 may also be arranged within the wind power plant 1 or centrally in the central grid, as indicated by the dashed line in FIG. 1.

Figure 2:
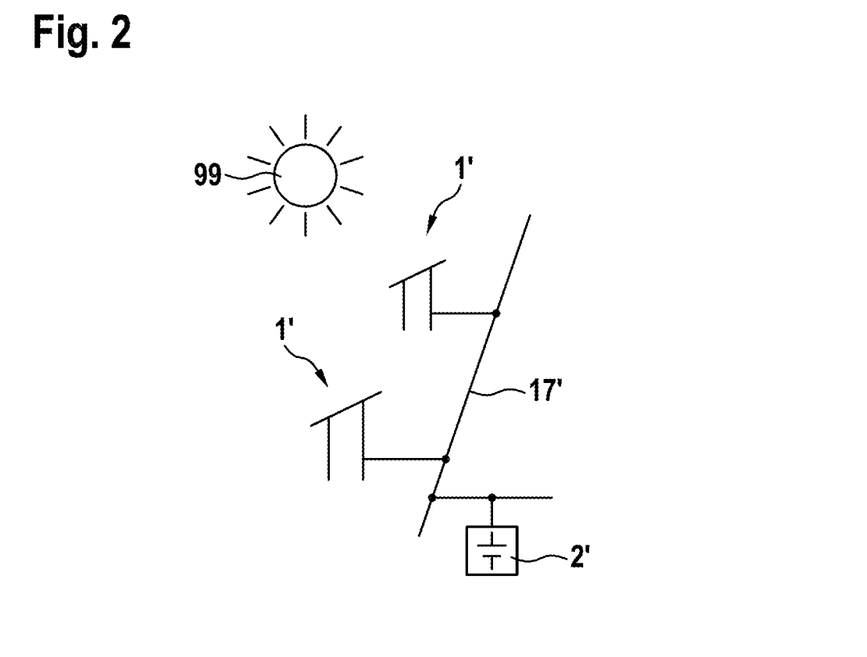
FIG. 2 a general representation relating to a solar power plant having a storage means according to another exemplary embodiment of the invention.

A further exemplary embodiment of the invention is represented in FIG. 2. There, instead of the wind power plant 1, photovoltaic units 1' are provided as regenerative energy generators, which are connected to each other and to the storage means 2' via a connection line 17'. The photovoltaic unit 1' does not require any rotating parts such as a wind rotor or rotating generator; it converts the radiation power applied by the sun 99 directly into electricity. Both, the wind power plant 1 and the photovoltaic unit 1', have in common that the respective primary source (wind or sunshine) cannot be controlled and can only be predicted to a limited extent. There are therefore considerable uncertainties regarding the power output.

The invention is explained below using the example of a regenerative energy generator with the primary source "wind". The same applies to other regenerative energy generators, such as photovoltaic units 1' in particular.

Figure 3:
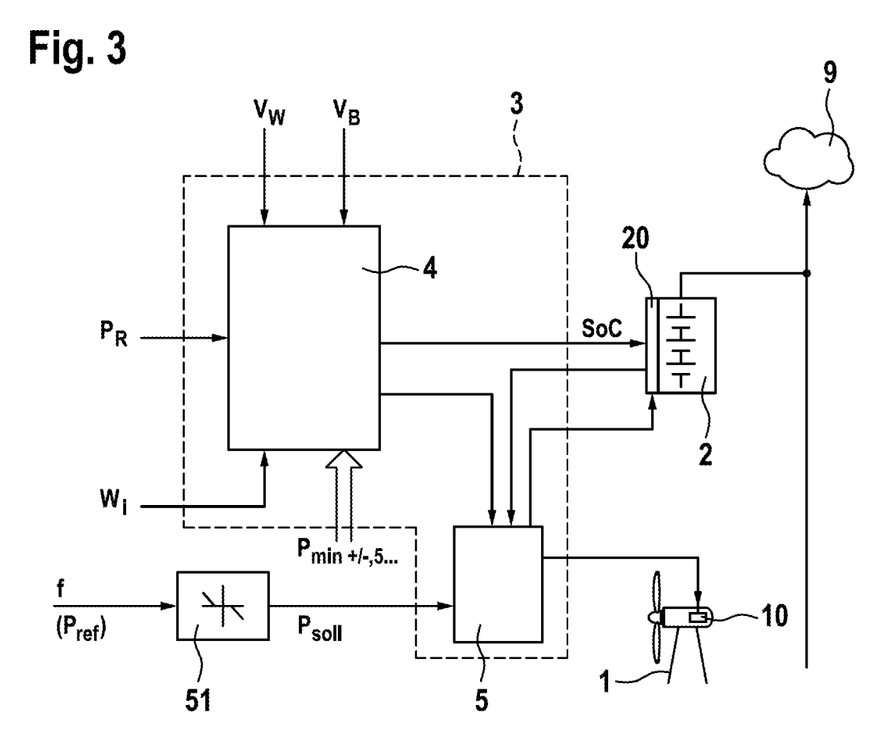
FIG. 3 a schematic block diagram relating to the control of the storage means and the wind power plant.

In order to improve the performance and to make the storage means 2 usable, not only for the provision of operating reserve, but also for other system services such as delayed generation, the invention provides an arrangement 3 consisting of a correction unit 4 and a sequential control unit 5. The operating reserve PR to be maintained is applied to the correction unit 4 as the main input variable. From this, it calculates a control signal for the state of charge SoC and applies this at its output to the charge control 20 of the storage means 2.

Further input data are applied to the correction unit 4, namely, in particular forecast data relating to the actual primary energy (in the example: wind) $V_W$ and to the predicted demand for energy $V_B$. Also applied are data for the minimum power to be maintained $P_{min}$ (positive and negative), confidence intervals 6 for the various parameters and, if applicable, further parameters such as capacity and power of the storage means, setpoint operating reserve and state of charge of the storage means. Also applied are weighting factors $W_i$ with which the energy, or power provision and delivery, can be weighted in a time-dependent manner. For this purpose, a time module is also provided in the correction unit 4.

The correction unit 4 further comprises an optimization means, in which an optimization method is implemented, for example a gradient method known per se.

The combined action of the correction unit 4 with the storage means 2 and its charge control 20 is as follows:

If the supply of primary energy (wind) is only low, it must nevertheless be ensured that the minimum operating reserve offered can be made available with the aid of the storage means 2. For this, the storage means 2 requires a certain state of charge, which it approaches in a defined manner. In Germany, for example, where primary operating reserve must be offered symmetrically, this state of charge (SoC) is 50%. This approach must be predictive, since the operating reserve must be available at all times. The forecast values for the Wind $V_W$, in particular, serve this purpose. In this case, the storage means 2 is used solely to guarantee that the primary control reserve is available as required.

If, on the other hand, sufficient primary energy is available (i.e. if the wind is blowing sufficiently strongly), then the (guaranteed) positive and negative operating reserve can be maintained both by the storage means 2 and by the wind power plant 1. The correction unit 4, together with the sequential control 5, now distributes the power between the wind power plant 1 and the storage means 2 in such a way that the minimum is guaranteed at all times, but on the other hand the storage means 2 can also be used as much as possible for other system services for the grid 9, such as production shifting.

The sequential control 5 receives reference signals for the setpoint power. Preferably, they are applied via a frequency static 51, which is designed to specify a lower setpoint power at grid frequencies above a nominal value (plus a standard tolerance), and a higher setpoint power at grid frequencies below the nominal value (again taking into account a standard tolerance).

Furthermore, the sequential control 5 exchanges signals with the charge control 20 regarding the actual power output of the wind power plant 1 and the actual state of charge of the storage means 1.

This is to be explained using the example of a wind farm having a plurality of wind power plants and a total rated output of 4 MW, as well as an storage-means capacity and output totaling 2 MWh and 2 MW respectively. In the event of a low supply of primary energy, in particular a lull, the storage means 2 must be kept at a state of charge of 1 MWh, i.e. 50% of its storage means capacity. It is thereby ensured that the guaranteed primary operating reserve of 1 MW can be maintained for a sufficiently long time. However, if the wind is sufficiently strongly, the storage means 2 can also be fully charged. In this case, the negative operating reserve would be provided by limiting the wind power plant 1. If, for example, sufficient wind and a period with low energy demand and low energy prices are forecast for the next time period (48 hours), the weighting is low and, with inclusion of the weighting factor, the storage means can then be charged at a time with low prices and then discharged again at times with higher prices (production shifting). The sequential control 5 causes the wind power plants 1 to adjust their respective power generation and, for example, to throttle the power generation when negative operating reserve is required, thus relieving the storage means 2 from having to take up power accordingly. In this way, not only are the existing wind power plants 1 and storage means 2 better utilized, but an additional yield is also realized. It is nevertheless ensured by the invention in this case that sufficient operating reserve is always available.

Figure 4:
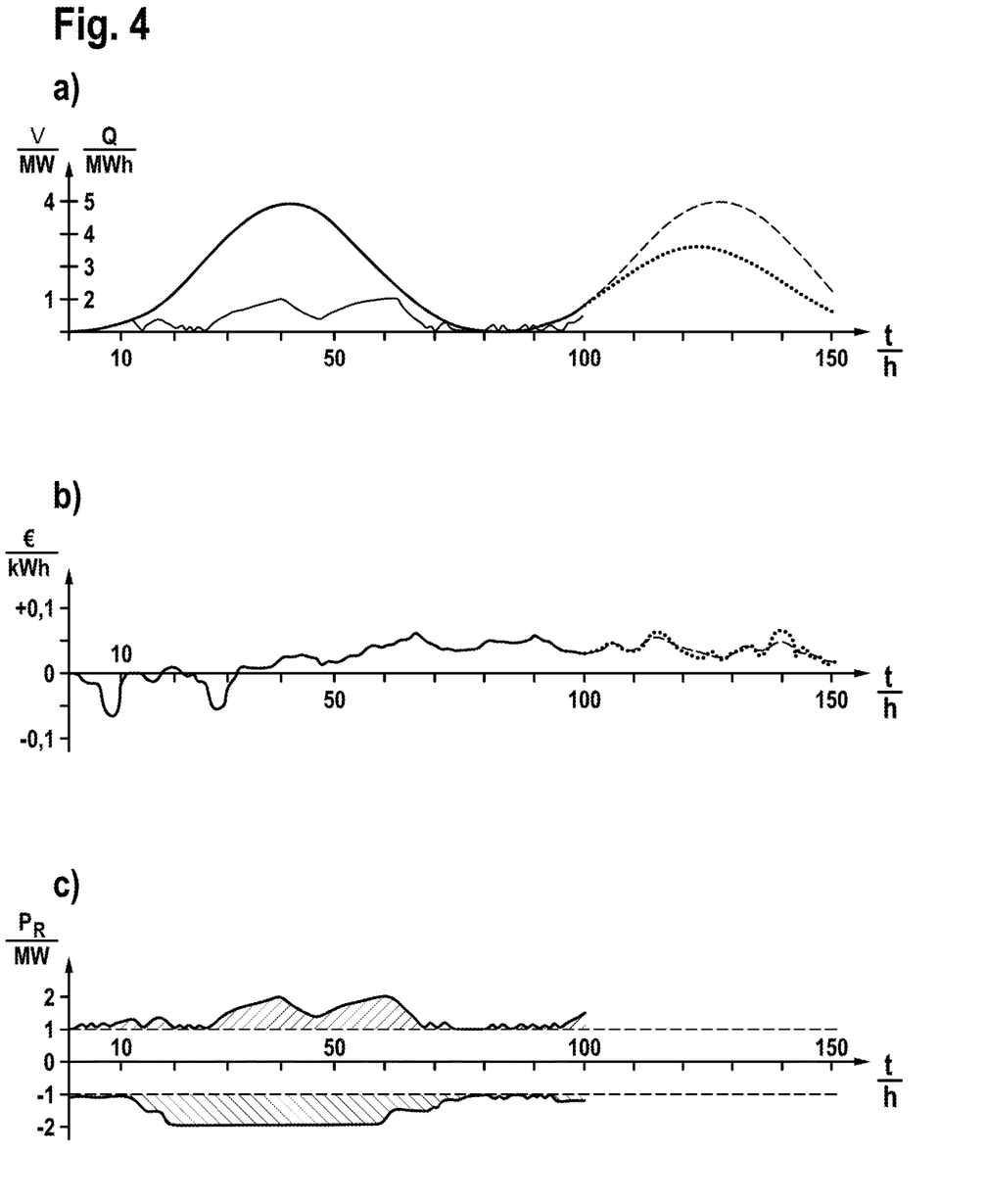

The result is visualized in FIGS. 4 *a*), *b*) and *c*). In FIG. 4*a*), the real power generation of the wind power plants 1 due to the wind conditions is shown by the thick solid line (the scale for the power P on the left of the y-axis of FIG. 4*a* is decisive), and the state of charge of the storage means 2 (the scale for the state of charge Q on the right of the y-axis of FIG. 4*a* is decisive) is shown by the thin solid line. A period of one week is considered (equal to 168 hours, of which only the first 150 hours are represented). Weighting factors (here in the form of clearing prices on the electricity exchange) are represented in FIG. 4*b*). Available power reserves are represented in FIG. 4*c*), namely the power reserve to be guaranteed, with the horizontal dashed line, and the actually available power reserve, with the solid line, in each case for positive power reserve (top) and negative power reserve (bottom).

Forecast data for the further course of the wind are represented in FIG. 4*a*) by a dotted line in the time range 100-150 h (the actual course that actually results but is not yet known at this point is shown by the dashed line). It can be seen from the state of charge of the storage means 2, represented by the thin line, that according to the invention the storage means 2 is charged differently by the correction device 4 at times when there is sufficient wind, namely, inter alia, in dependence on the (predicted) weighting factors. If there is only little wind, the state of charge is substantially kept at the conventional value of 50% (corresponding to 1 MWh); if there is a lot of wind, higher states of charge are approached.

FIG. 4c) shows the power reserve available at each point in time. As can be clearly seen, the positive reserve is always 1 MW or greater (equal to or above the upper dashed line), and the same applies to the negative reserve, which is always beyond −1 MW. It can be seen that the guaranteed values (dashed horizontal lines) for 1 MW positive operating reserve and 1 MW negative operating reserve are always met. The power used for "production shifting" is indicated by the shaded area.

Figure 5:
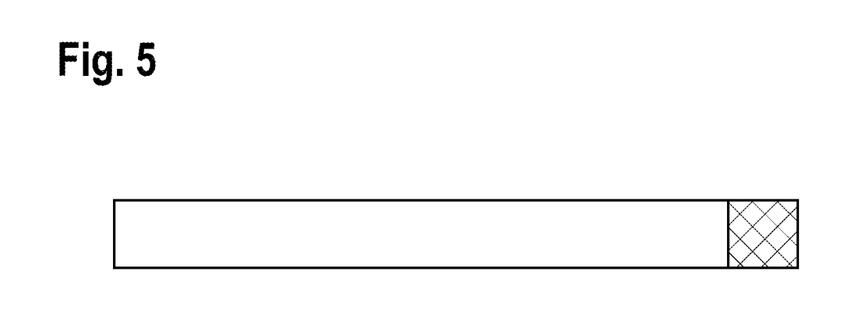
FIG. 5 a representation of the gain.

Advantages thus ensue, not only for the operational reliability and power supply of the electricity grid 9, but also in terms of yield for the operator of the wind power plant. FIG. 5 shows the additional yield achievable through the additionally provided system service in the context of the production shifting (see shaded area). This is quite relevant, especially in view of the fact that, according to the invention, no additional storage means are required, but rather in essence the existing storage means are better utilized.

The invention claimed is:

1. An arrangement comprising a regenerative energy generator and a storage for electrical energy for delivery to a grid, wherein the regenerative energy generator has a regenerative energy converter for converting renewable energy sources into electrical energy, and a power controller that has an input for a setpoint power output and monitors power generation by the regenerative energy converter, and a charge control for the storage, which outputs a signal for an actual state of charge (SoC) of the storage,
   wherein the charge control is configured to set a minimum energy reserve which is to be kept available by the storage at all times to compensate for differences between power generation and power consumption in the grid,
   wherein a correction circuitry is connected to the charge control and outputs a signal for a setpoint state of charge (SoC) of the storage,
   wherein a measure of an available primary power is applied to the correction circuitry as an input parameter,
   wherein the correction circuitry is configured to output the signal for the setpoint state of charge (SoC) as a function of the available primary power, wherein the setpoint state of charge (SoC) is reduced when the available primary power decreases and is increased when the available primary power increases, and
   wherein a sequence control circuitry is controlled by the correction circuitry and acts upon the power controller of the regenerative energy generator in dependence on an output value of the correction circuitry, such that an adjustment to the signal for the setpoint state of charge (SoC) of the storage by the correction circuitry causes a modification of the setpoint power output of the regenerative energy generator.

2. The arrangement of claim 1, wherein the sequential control circuitry acts upon the power controller in such a manner that the sequential control circuitry has a master/slave relationship with the correction circuitry of the storage, wherein the correction circuitry is the master.

3. The arrangement of claim 1, wherein the correction circuitry is configured for a plurality of input parameters that comprises at least one of predicted values for electricity demand in the grid, the minimum energy reserve to be held available, storage capacity and power, setpoint energy reserve, and state of charge of the storage.

4. The arrangement of claim 3, wherein additional static statistical characteristics are applied.

5. The arrangement of claim 1, wherein the correction circuitry is configured for determining the signal for the setpoint state of charge (SoC) of the storage based on the plurality of input parameters via an optimizer.

6. The arrangement of claim 5, wherein the optimizer implements a gradient method, a neural network or an evolutionary algorithm.

7. The arrangement of claim 3, wherein the plurality of input parameters are time-phased, and the correction circuitry evaluates the plurality of input parameters in a time-dependent manner.

8. The arrangement of claim 3, wherein weighting factors (Wi) are provided for at least one of the plurality of input parameters.

9. The arrangement of claim 1, wherein a reference signal for a setpoint power output is applied externally or is generated internally.

10. A method for operating an arrangement that comprises a regenerative energy generator and a storage for electrical energy for delivery to a grid, wherein the regenerative energy generator has a regenerative energy converter for converting renewable energy sources into electrical energy, and a power controller that has an input for a setpoint power output and monitors power generation by the regenerative energy converter, and a charge control for the storage, which outputs a signal for an actual state of charge of the storage, the method comprising:
   outputting a signal for a setpoint state of charge by a correction circuitry connected to the charge control, and responsively adjusting power generated by the regenerative energy generator by a sequence control circuitry that is controlled by the correction circuitry and that acts upon the power controller of the regenerative energy generator in dependence on an output value of the correction circuitry,
   wherein the charge control sets a minimum energy reserve which is to be kept available by the storage at all times to compensate for differences between power generation and power consumption in the grid,
   wherein a measure of an available primary power is applied to the correction circuitry as an input parameter,
   wherein the correction circuitry is configured to output the signal for the setpoint state of charge (SoC) as a function of the available primary power, wherein the setpoint state of charge (SoC) is reduced when the available primary power decreases and is increased when the available primary power increases,
   wherein an adjustment to the signal for the setpoint state of charge (SoC) of the storage by the correction circuitry causes a modification of the setpoint power output of the regenerative energy generator.

11. The arrangement of claim 1, wherein the measure of the available primary power comprises forecast values for the available primary power.

12. The arrangement of claim 4, wherein the additional static characteristics are for a confidence interval.

13. The arrangement of claim 8, wherein the weighting factors are provided for at least one of forecast electricity demand in the grid and generated power.

14. The arrangement of claim 13, wherein the weighting factors are provided separately for positive and negative.

* * * * *